(12) United States Patent
Bengs et al.

(10) Patent No.: US 6,908,885 B2
(45) Date of Patent: Jun. 21, 2005

(54) GEL COMPRISED OF A POLY-α-1,4-GLUCAN AND STARCH

(75) Inventors: Holger Bengs, Frankfurt am Main (DE); Ivan Tomka, Zürich (CH); Rolf Müller, Zürich (CH)

(73) Assignee: Suedzucker Aktiengesellschaft Mannheim/Ochsenfurt (DE)

( * ) Notice: Subject to any disclaimer, the term of this patent is extended or adjusted under 35 U.S.C. 154(b) by 0 days.

(21) Appl. No.: 10/258,465

(22) PCT Filed: May 8, 2001

(86) PCT No.: PCT/EP01/05209

§ 371 (c)(1),
(2), (4) Date: Feb. 19, 2003

(87) PCT Pub. No.: WO01/85836

PCT Pub. Date: Nov. 15, 2001

(65) Prior Publication Data

US 2003/0185863 A1 Oct. 2, 2003

(30) Foreign Application Priority Data

May 8, 2000 (DE) .......................... 100 22 095

(51) Int. Cl.[7] ............................. A01N 25/04; C08J 3/75; C08L 3/02; B01J 13/00
(52) U.S. Cl. ....................... 504/366; 71/64.09; 424/488; 514/778; 514/944; 526/105
(58) Field of Search ......................... 504/366; 71/64.09; 424/488; 514/778, 944; 526/105; 516/105

(56) References Cited

U.S. PATENT DOCUMENTS

| | | | |
|---|---|---|---|
| 3,128,209 A | 4/1964 | Germino et al. | 127/71 |
| 3,265,632 A | 8/1966 | Leach et al. | 252/316 |
| 3,336,429 A | 8/1967 | Carevic | 264/186 |
| 4,071,616 A | 1/1978 | Bloch | 424/76 |
| 4,626,288 A | * 12/1986 | Trzasko et al. | 106/206.1 |
| 6,323,265 B1 | 11/2001 | Bengs et al. | 524/56 |

FOREIGN PATENT DOCUMENTS

| | | |
|---|---|---|
| DE | 26 53 244 | 6/1977 |
| DE | 197 29 273 A1 | 1/1999 |
| DE | 198 60 374 A1 | 7/2000 |
| DE | 198 60 375 A1 | 7/2000 |
| JP | 10-37262 | 2/1989 |

OTHER PUBLICATIONS

"Structure of Amylomaize Amylose", Takeda et al., Cereal Chemistry, vol. 66, No. 1, 1989, pp. 22–25.

"Structures and Properties of Sago Starches with Low and High Viscosities on Amylography", Takeda et al., Journal of Food Science, vol. 54, No. 1, 1989, pp. 177–182.

"Two–Dimensional $^1H$ and $^{13}C$ NMR Spectroscopy and the Structural Aspects Amylose and Amylopectin", Falk et al., Monatshefte Für Chemie 128, 1997, pp. 777–784.

Official Action in German 100 22 095.9 dated Sep. 23, 2004.

* cited by examiner

*Primary Examiner*—S. Mark Clardy
(74) *Attorney, Agent, or Firm*—Marshall, Gerstein & Borun LLP

(57) ABSTRACT

The invention relates to a gel based on poly-α-1,4-D-glucan and, optionally, on starch as well as on a swelling agent, to a method for the production thereof, and to the use of a gel of this type.

30 Claims, 11 Drawing Sheets

(1)
(2)
(3)

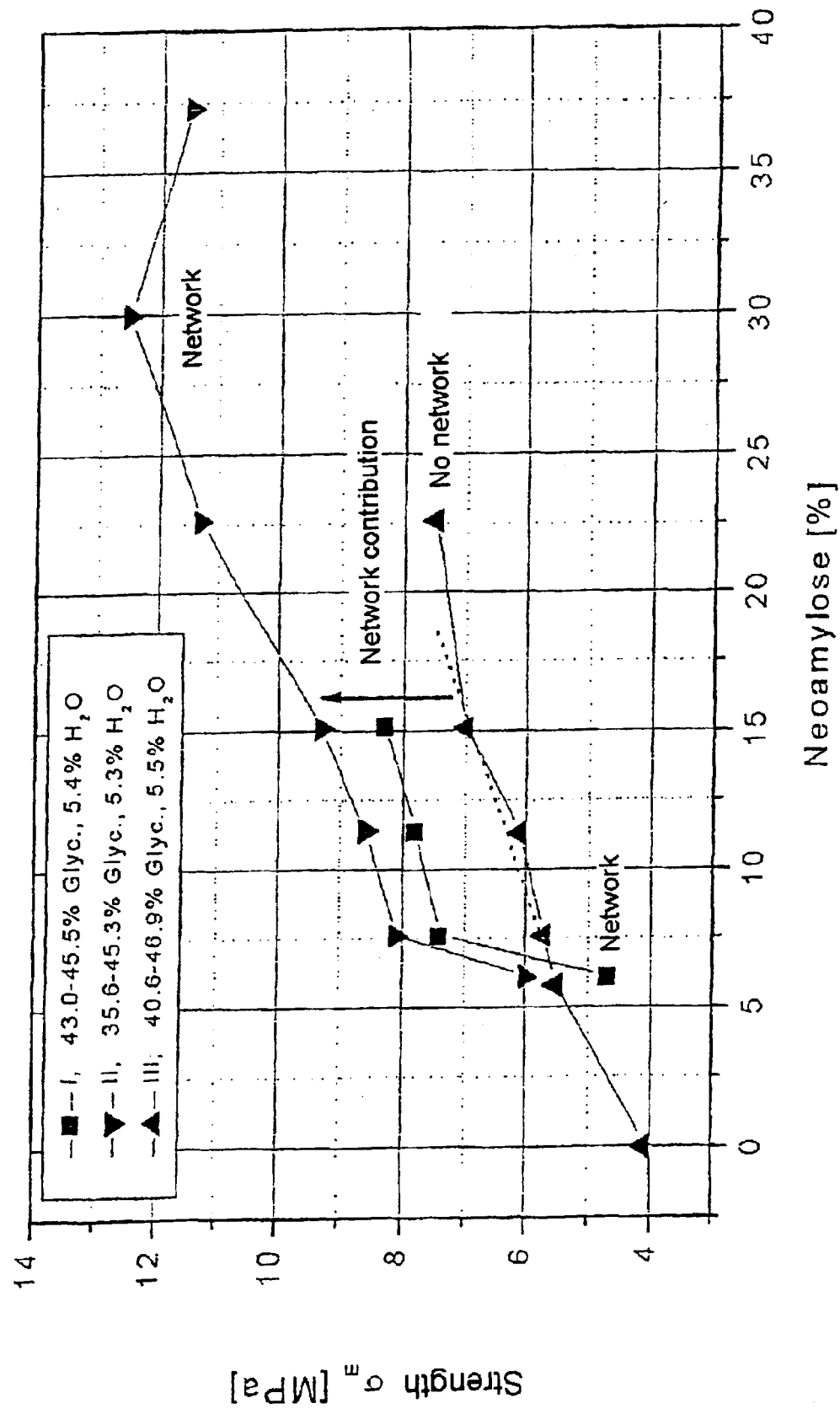
Fig. 2.1:

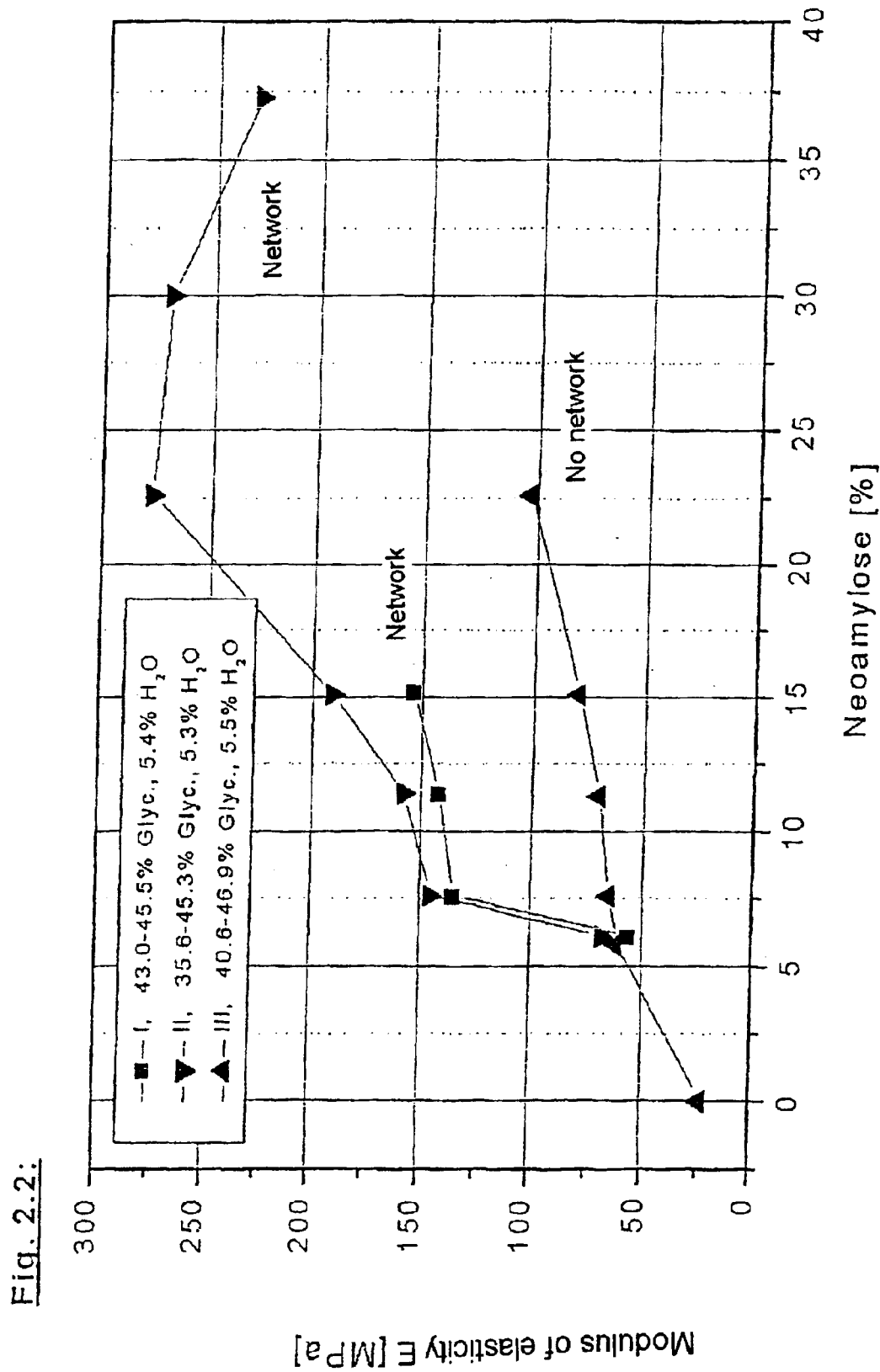

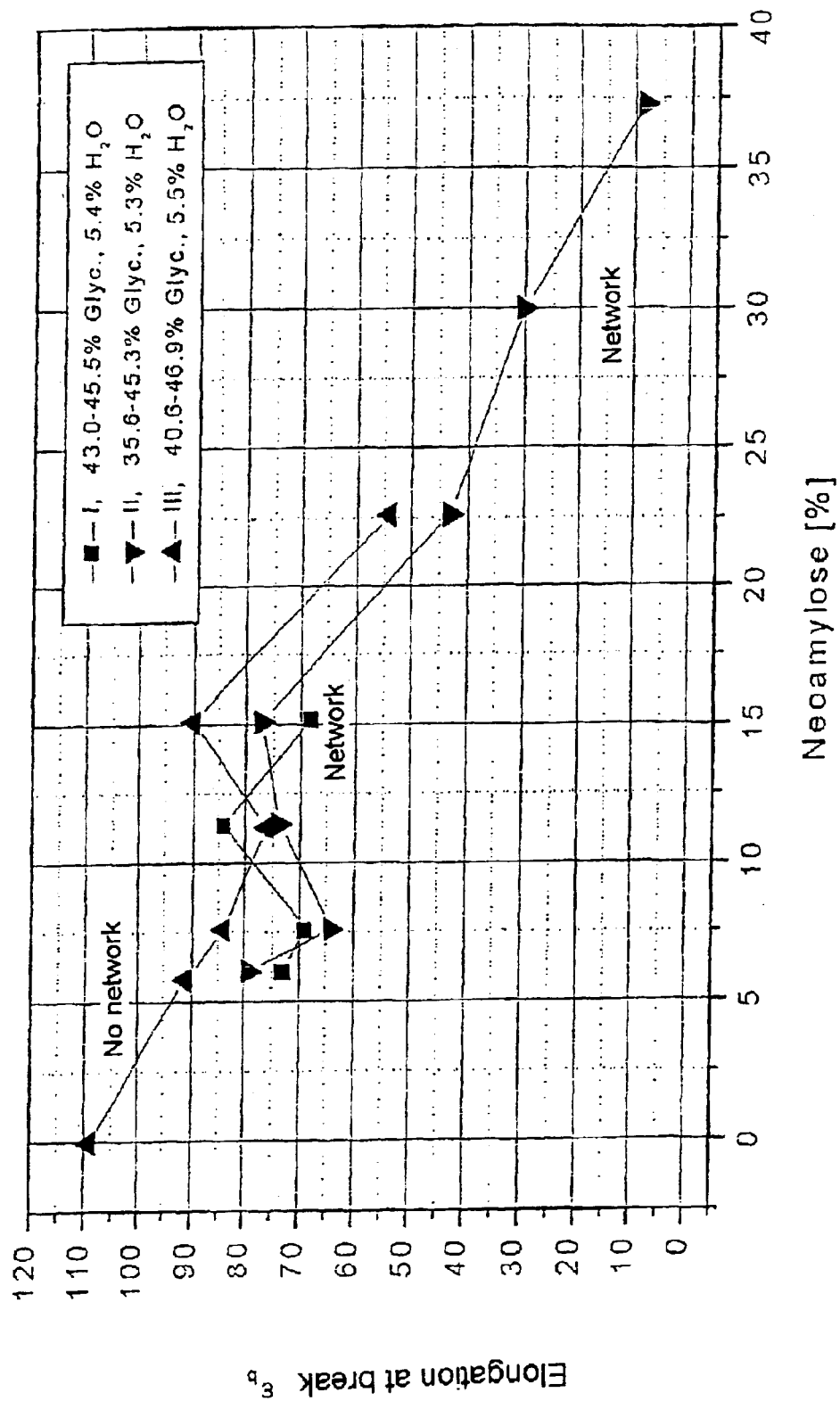
Fig. 2.3:

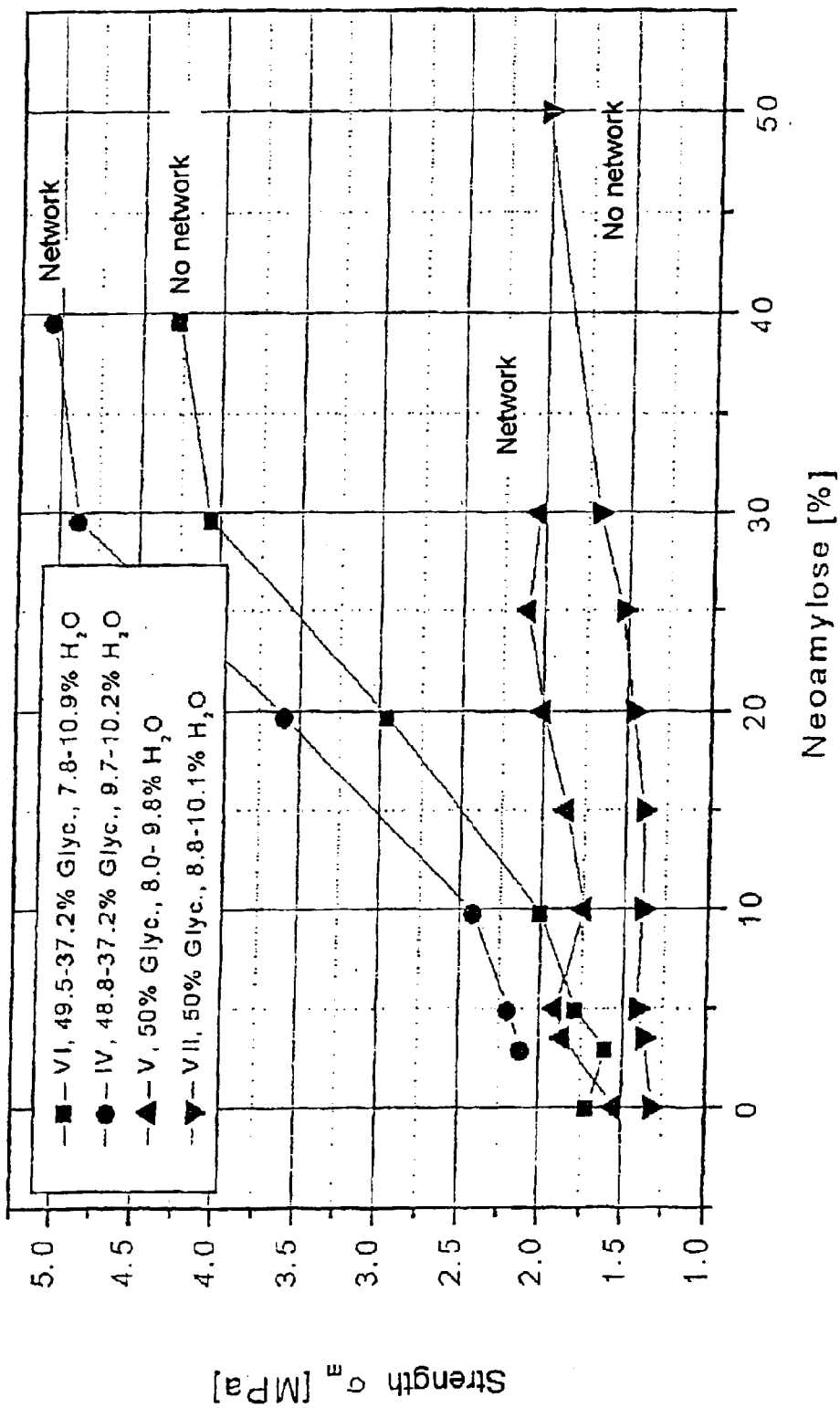
Fig. 3.1:

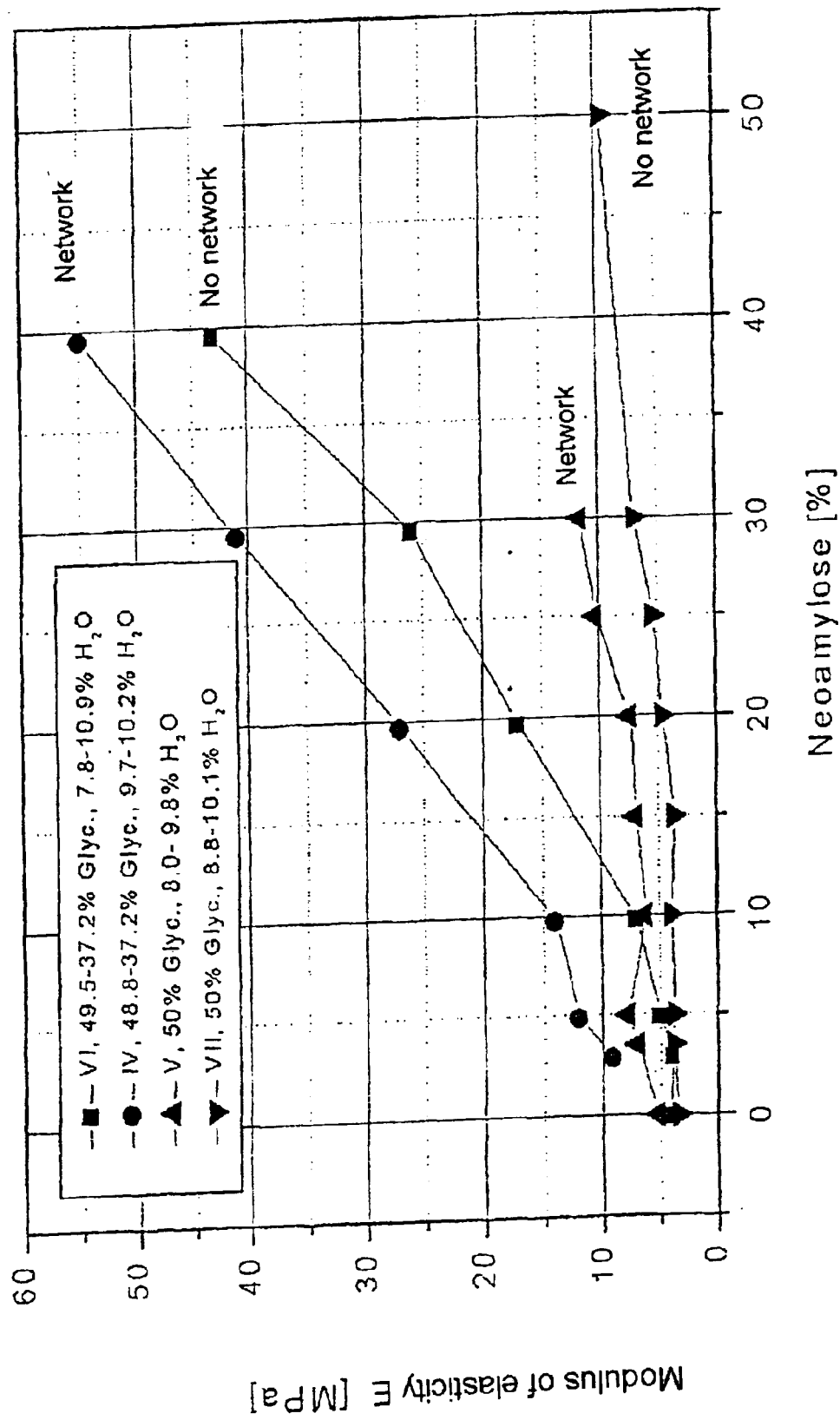
Fig. 3.2:

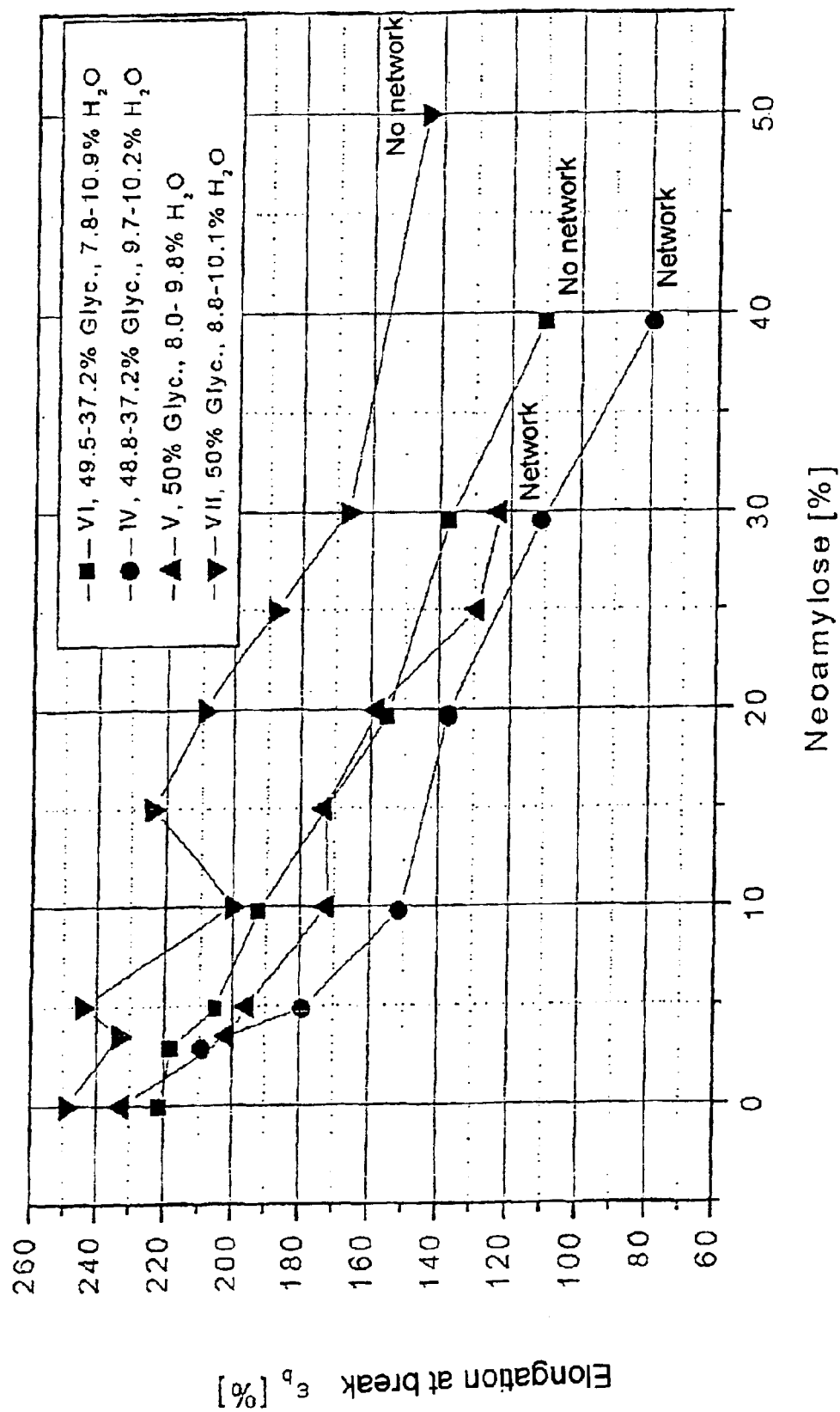

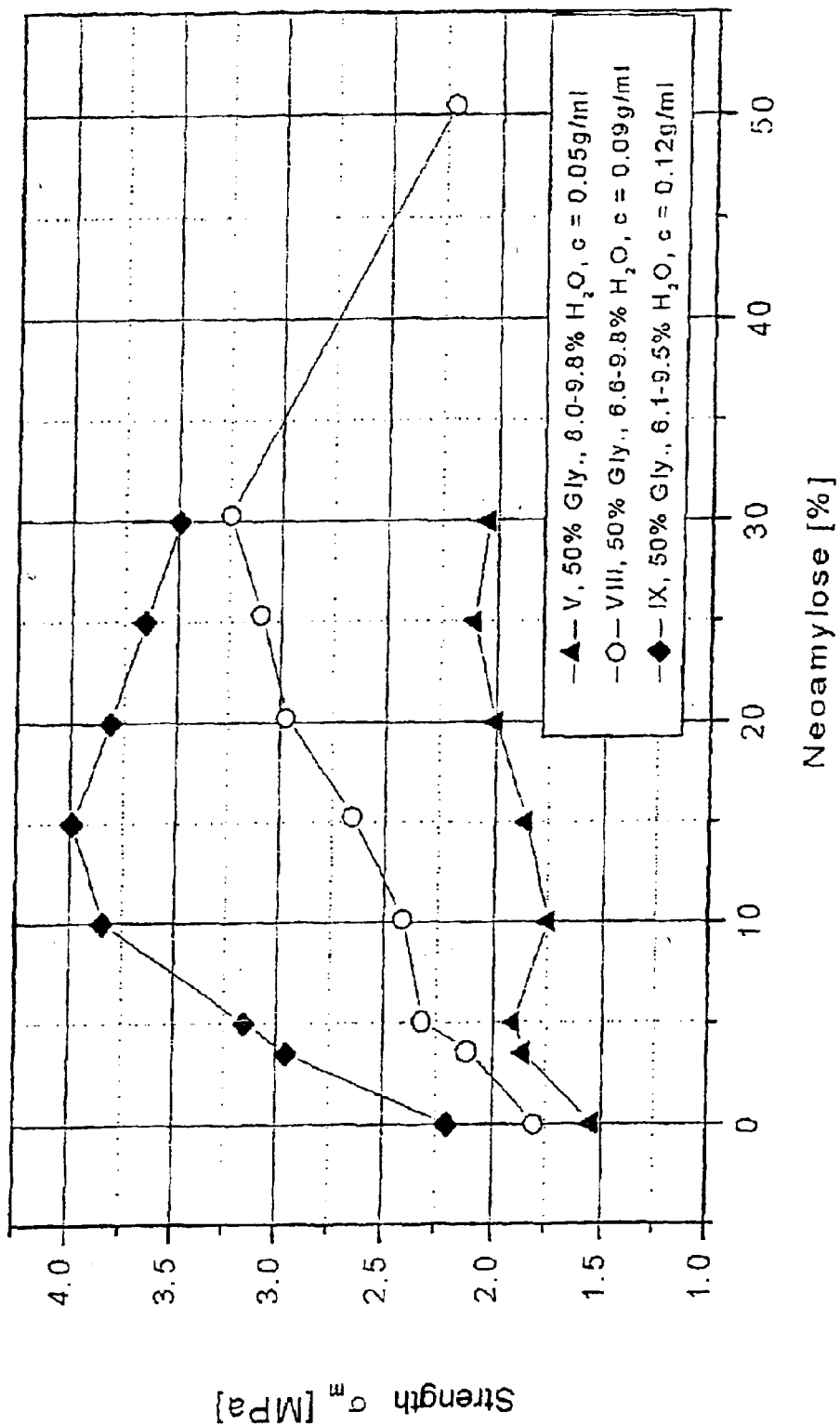
Fig. 4.1:

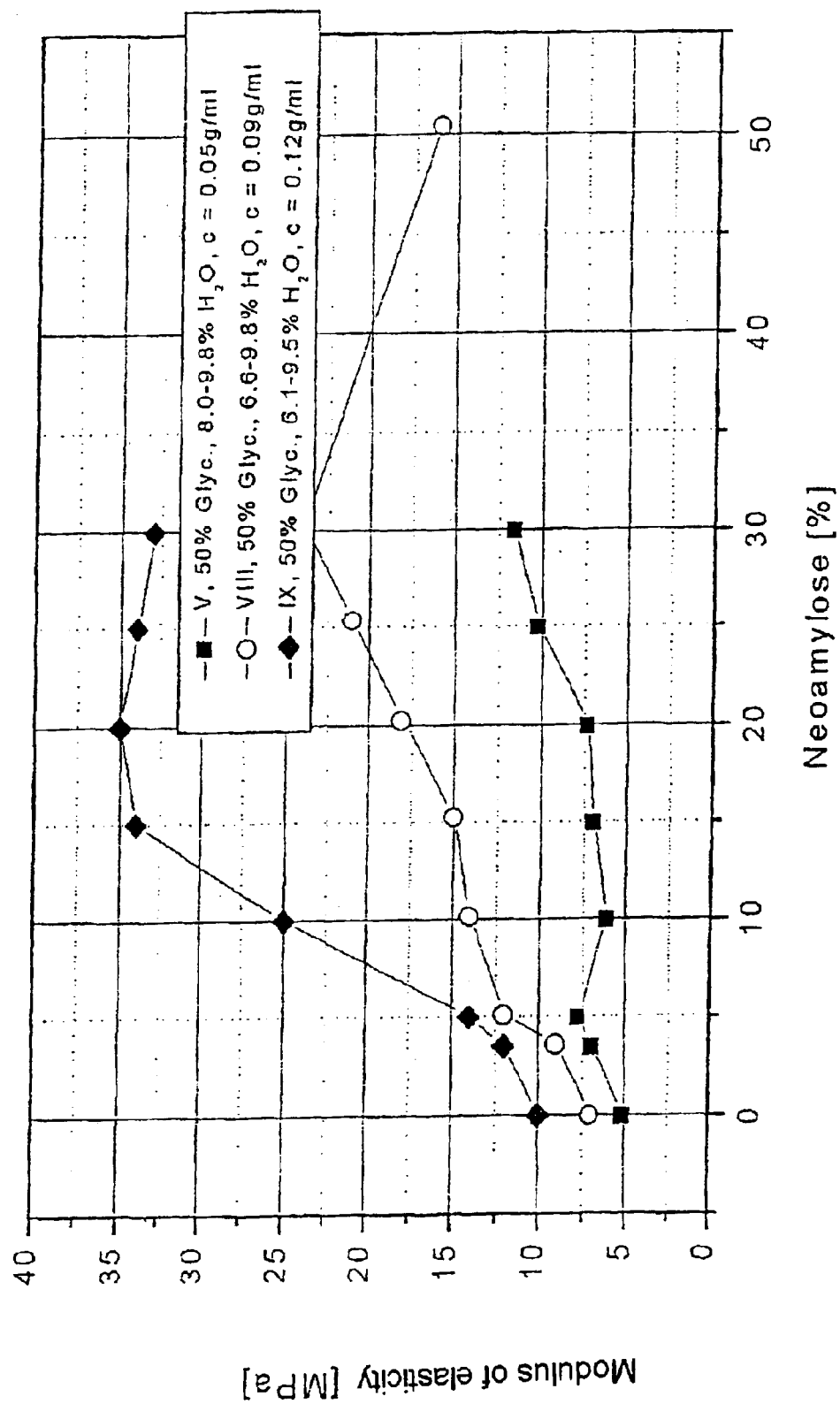
Fig. 4.2:

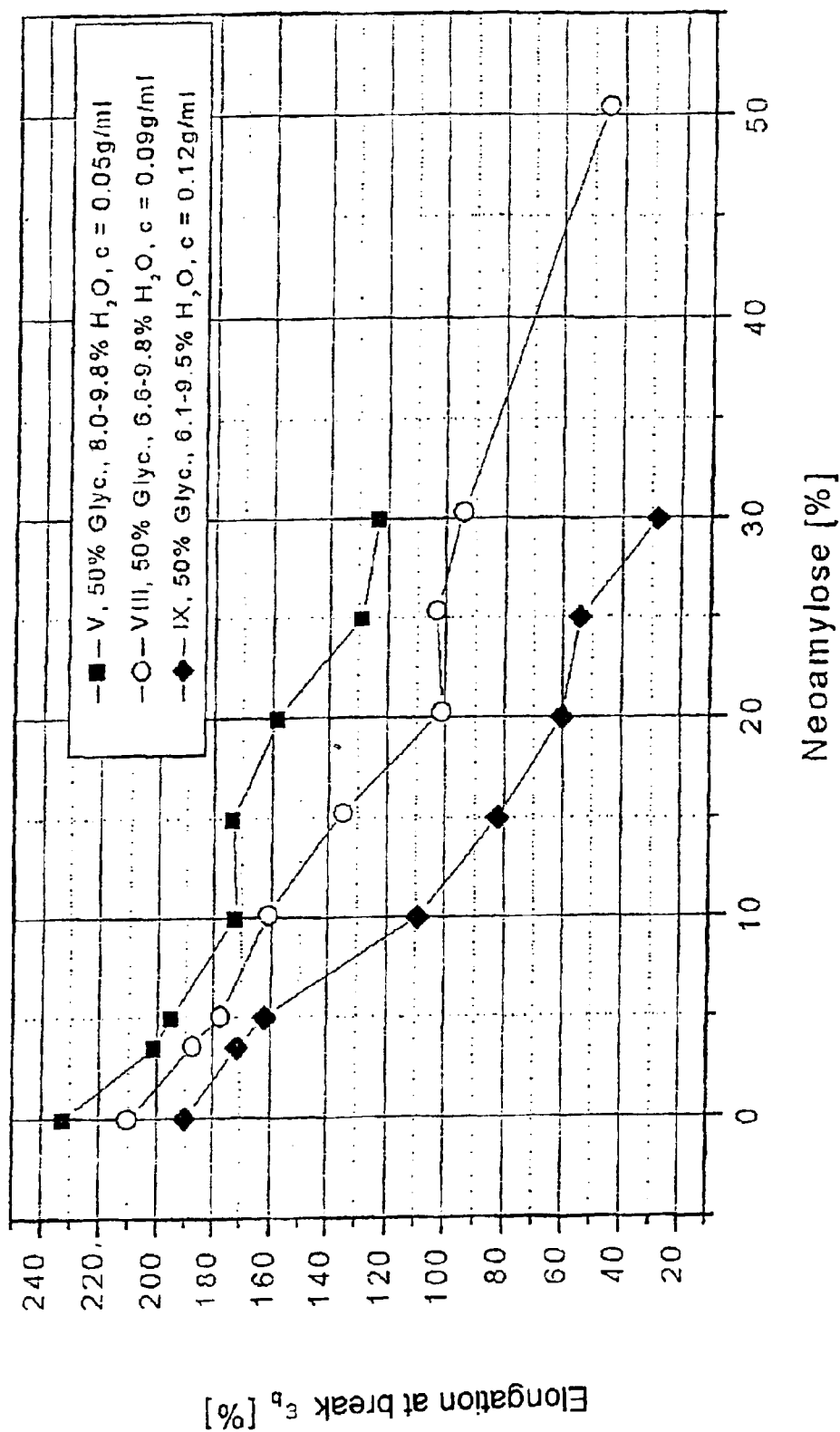
Fig. 4.3:

GEL COMPRISED OF A POLY-α-1,4-GLUCAN AND STARCH

This is the U.S. national phase of International Application No. PCT/EP01/05209 filed May 8, 2001, the entire disclosure of which is incorporated herein by reference.

The present invention relates to a gel based on a poly-α-1,4-glucan with or without starch and a process for producing such a gel and its use.

Gels are elastic microphases in the swollen state. In this case the elastic microphase is made up by percolation of structural elements which can have molecular or supermolecular dimensions and form a spatial network.

Gel formation can proceed via a spinodal or a growth process. In the second case, a branching process precedes the percolation.

Gels can store mechanical energy.

If this mechanical energy is introduced via shearing vibration, the response function of the gel can be described using the frequency-dependent complex sheer modulus. The real part of this modulus, the storage modulus, describes the mechanical properties of the network, and the imaginary part describes the viscous flow and thus the dissipation of the energy introduced into the phase of the swelling medium.

In equilibrium, the swelling state, the swelling of the gel, is advantageously given by the volume fraction of the network.

According to Flory & Barrett, in Disc. Farad. Soc. 57, 1 (1974), four types of gels are distinguished:
1. ordered lamellar structures of mesophases or silicate phases;
2. disordered covalent macromolecular networks having branched and linear polymers;
3. macromolecular networks having ordered crosslinking points and disordered regions linking these; and
4. disordered structures of highly anisotropic particles, flocculant precipitates and coacervates.

Known gels comprise gelatin, salicic acid, montmorrilonite, bentonites, polysaccharides, pectins, inter alia, as gelling agent and a liquid, customarily water, as dispersion medium or swelling medium.

Of these, gelatin in particular is used, for example in the food and drink industries for producing, inter alia, jellied meats, jellies, puddings, ice cream and yogurts or for clarifying wines and fruit juices; in pharmacy and medicine for producing hard and soft capsules, suppositories, as binder for tablets, stabilizer for emulsions and blood plasma extenders; in cosmetics as a constituent of lotions, pastes and creams; for microencapsulation of dye solutions for modern carbon papers.

Gelatin is a polypeptide which is principally produced by hydrolyzing the collagen present in skin and bones of animals.

In the course of the problems concerning transmissible spongiform encephalopathies (Creutzfeld-Jakob disease, bovine spongiform encephalopathy, scrapy) and owing to the discussion regarding vegetarian alternatives to gelatin-containing gels and dosage forms which meet "kosher" or "halal" requirements, there is a need for alternative products which can be produced without using animal proteins, or which consist of raw materials which are not based on animal sources.

The literature discloses numerous examples as to how gels and networks can be built up based on carbohydrates. Thus, Yamada, Watei & Wakao, in JP 030986038 describe a process for producing capsules consisting of a mixture of cellulose and starch for use in foods and pharmaceutical applications.

In the publication WO 92/09274, the partial replacement of gelatin in capsule production by amylose-enriched starch is proposed.

U.S. Pat. No. 5,342,626 describes the production of films from carrageenan, gellans and mannans. The production costs of these gels and networks and their disadvantageous mechanical properties currently hinder their broad application.

In addition, it is well known in the subject area that starches and mixtures of starches with other components can be used for producing thermoplastic materials. These are disclosed, for example, in EP 397819, EP 542155, WO 99/02660, WO 99/02595, WO 99/02040. In contrast to thermoplastic materials which convert under temperature elevation without transition to the melt, the gels described here, on temperature increase, exhibit between the glass transition temperature and the melting temperature a broad temperature range having rubbery elastic behavior. In this range the gels cannot flow. The shear modulus-temperature behavior exhibits in this rubbery elastic region with gels a stepwise course which is not the case for thermoplastics.

Native starch consists, inter alia, of amylose and amylopectin, with not only native amylose, but also debranched starch having a degree of branching which, in contrast to textbook knowledge is >0 (see in this context: Hizukuri, S.; Carbohydrate Research, 94 (1981), 205–213; Praznik, W.; Starch/Stärke, 46 (1994), 3, 88–94; Cheng-Yi, L.; Proc. Natl. Sci. Counc. Vol. 11, No. 4, 1987, 341–345).

In view of this prior art, it was therefore an object of the present invention to provide a plant-based alternative to gelatin.

Furthermore, inventive gels are to exhibit good processing in "state of the art high throughput" machines and adequate mechanical properties for further processing to form films, capsules, sheeting, monofilament or fiber and also delayed release systems.

This object, and other objects not explicitly mentioned, but which can be derived or inferred readily from the conditions discussed herein at the outsent, are achieved by the subject matter of the invention.

The present invention therefore relates to a gelling agent based on poly-α-1,4-glucan with or without starch, which, on addition of a swelling agent, or a suitable solvent, can form a gel.

The present invention further relates to a gel based on poly-α-1,4-glucan with or without starch, its production and use.

Surprisingly, it has been found by the abovementioned inventors, that, starting from a mixture of water-insoluble linear poly-α-1,4-glucan having a high crystalline content with or without starch and a swelling agent, the production of highly stable and rarely processable and handleable gels/networks is possible.

The inventive gels of poly-α-1,4-glucan with or without starch are similar in structure and composition to the gelatin/water gels and poly(vinyl chloride)/plasticizer gels, as have been described by I. Tomka in "Stand der Forschung an der photographischen Gelatine" [State of research on photographic gelatin] Chimia, 30, 534, 1976 and by K. Te Nijenhuis (Dissertation, Delft, 1979).

In these three systems, ordered crosslinking points link disordered regions (see gel type 3 according to Flory, supra.).

The crosslinking points in the inventive gels arise via crystallization of poly-α-1,4-glucan, if appropriate in cocrystallization with a portion of starch molecules, the non-crystallized starch forming the disordered regions.

Poly-α-1,4-glucans are linear polysaccharides consisting of glucose monomers, the latter making up the polymer backbone by forming α-1,4-glycosidic bonds. The most frequently naturally occurring poly-α-1,4-glucan is amylose which, together with the more highly branched amylopectin, forms the basic substance of plant starch.

Poly-α-1,4-glucan (hereinafter also termed polyglucan or PG) and also starch, share the great advantage that they are nontoxic and are biodegradable. Because of these advantageous properties, they are suitable in principle for use in the food sector and also in pharmacy and medicine.

According to the invention the linear polyglucans have a degree of branching of $\leq 10^{-2}$, particularly preferably $\leq 10^{-3}$, and very particularly preferably $\leq 10^{-4}$. Most preference is given to polyglucans having a degree of branching of $10^{-6}$.

Degree of branching is taken to mean here the ratio between the number of moles of 1,4,6-α-D-glucan units to the number of moles of 1,4-α-D-glucan units.

Polyglucans suitable for the invention are, in particular, those which have no branches, or whose degree of branching is so minimal that it is not detectable.

For the present invention, the prefix "α" solely relates to the links which form the polymer backbone and not to the branches.

The linear polyglucan preferably used according to the invention is water-insoluble, where according to the invention the term "water-insoluble polyglucan" is taken to mean compounds which, according to the definition of the German pharmacopeia (DAB=Deutsches Arzneimittelbuch, Wissenschaftliche Verlagsgesellschaft mbH, Stuttgart, Govi-Verlag, Frankfurt, 1987 edition) in accordance with classes 5 to 7, fall under the categories "slightly soluble", "very slightly soluble", or "practically insoluble" compounds.

In the case of the polyglucans preferably used according to the invention, this means that at least 99.5% is insoluble in water under standard conditions (T=25° C.±20%, p=101325 pascals±20%) (corresponding to class 5).

For the present invention, slightly soluble to practically insoluble compounds, in particular very slightly soluble to practically insoluble compounds, are particularly preferred. "Very slightly soluble" corresponding to class 6 can be illustrated by the following experimental description.

One gram of the polyglucan under test is heated in 1l of deionized water to 130° C. at a pressure of 1 bar. The resultant solution only remains stable for a short time over a few minutes. On cooling under standard conditions, the substance precipitates out again. After cooling to room temperature and separation by means of centrifugation, taking into account the experimental losses, at least 66% of the amount used can be recovered.

The linear polyglucan which can be preferably used according to the invention further has a molecular weight distribution or polydispersity (defined as the ratio of weight-average and number-average molar masses $M_w/M_n$) which varies depending on the production process of the polyglucan. Preferred values are from 1.01 to 50, in particular from 1.01 to 15.

Polyglucans which are very particularly preferable for the purposes of the present invention are those having low polydispersity of from 1.01 to 5. More preferred polyglucans are those having a polydispersity of from 1.01 to 2.5. Polyglucans which are most preferred are those having a polydispersity of from 1.01 to 2.

The inventively used polyglucans can be of any origin, provided that the abovementioned conditions with respect to the terms "linear" and preferably also "water insoluble" and "polydispersity" are met.

They can be produced by natural or bioengineering techniques.

For example, they can be obtained from natural plant or animal sources by isolation and/or purification.

Sources can also be used which have been genetically manipulated in such a manner that, compared with the non-manipulated source, have a higher content of unbranched polyglucans, or polyglucans branched to a relatively slight extent.

They can have been produced by enzymatic or chemical debranching from non-linear polyglucans.

Bioengineering methods include biocatalytic processes, biotransformation processes or fermentation processes.

Modified polyglucans can also be used, in which case the polyglucans can have been chemically modified, for example, by esterification and/or etherification in one or more positions which do not participate in the linear linkage. In the case of the preferred 1,4-linked polyglucans, the modification can take place in the 2, 3 and/or 6 position.

Modification in the context of the invention means that the hydroxyl groups present which do not participate in the linkage are chemically modified. This excludes, for example, ring opening of the glucan units, as takes place in oxidative carboxylation or hydrolysis. Measures for such modifications are extensively known to those skilled in the art.

According to the invention, poly-α-1,4-glucan is preferably used as can be produced or isolated, for example, according to the process described in WO 95/31553.

The production described there is performed enzymatically using a protein having the activity of amylosucrase.

Other proteins suitable for producing poly-α-1,4-glucan are phosphorylases, glycogen syntheses, glucan transferases and starch synthases.

Production can be carried out via in vivo methods using possibly genetically manipulated organisms such as bacteria, fungi or algae or higher plants which contain the abovementioned proteins.

Preferably, the inventively used polyglucan has a degree of polymerization of at least 30, in particular in a range from 40 to 300, and particularly preferably from 50 to 100.

A polyglucan having this degree of polymerization, as can also be obtained, for example, according to the abovementioned process according to WO 95/31553, has a marked tendency to formation of a regular conformation. This is a double helix molecular morphology having high crystalline content which can be detected using nuclear magnetic resonance spectroscopy (NMR) and X-ray diffraction.

On the basis of the observations made, the following conclusions have been drawn:

The changing crystal structure as a result of thermal modification is similar to that in potato starch, but the kinetics of modification are somewhat more rapid than those in potato starch.

The formation of molecular complexes with suitable low-molecular-weight mixing components, such as fatty acids, is coupled to the partial conformation conversion to the monohelical V structure, as is known for amylose. In part, furthermore, there follows the formation of a secondary unidentified, and therefore unknown, structure. The ability for complex formation is approximately three times higher than that of amylose.

These inventively preferably used polyglucans combine the ability of the two starch components amylose and amylopectin in such a manner that the regular conformational characteristics characterizing the two components can be formed as desired.

In other words, the polyglucans which are preferably used inventively combine advantageously the good processability of degraded starch and the desired properties of crystalline starch.

They exhibit a pronounced tendency to crystallization and a high crystallinity.

The starch constituent of the inventive gel can be any starch or a mixture of two or more thereof, one or more derivatives thereof or mixtures of starch and starch derivatives.

Suitable starch examples are starch from potatoes, tapioca, manioc, rice, wheat or corn. Further examples are starches from arrowroot, sweet potato, rye, barley, millet, oats, sorghum, starches from fruits such as chestnuts, acorns, beans, peas and other legumes, bananas, and plant pith, for example of sago palms.

In other words, the ratio of amylose and amylopectin in these starches can be not only $\leq 0.5$ but also $\geq 0.5$.

The starch can be hydrothermally and/or mechanically pretreated.

In addition to starches of plant origin, starches can also be used which are chemically modified, have been produced by fermentation, are of recombinant origin or have been produced by biotransformation or biocatalysis.

"Chemically modified starches" are taken to mean in the invention those starches in which, chemically, the properties have been changed compared with the natural properties. This is essentially achieved by polymer-analogous reactions, in which starch is treated with monofunctional, bifunctional or polyfunctional reagents or oxidizing agents. In this treatment, preferably the hydroxyl groups of the polyglucans of the starch are converted by etherification, esterification or selective oxidation, or the modification is based on a free-radical initiated graft copolymerization of copolymerizable unsaturated monomers onto the starch backbone.

Particular chemically modified starches include, inter alia, starch esters, such as xanthogenates, acetates, phosphates, sulfates, nitrates, starch ethers, for example nonionic, anionic or cationic starch ethers, oxidized starches, for example dialdehyde starches, carboxyl starches, persulfate-degraded starches and similar substances.

Preferred chemical modifications comprise hydroxypropylation, acetylation and ethylation.

"Fermentation starches" are, in the terminology of the invention, starches which can be produced by fermentation processes using organisms occurring in nature, such as fungi, algae or bacteria, or can be produced with the inclusion and aid of fermentation processes. Examples of starches from fermentation processes comprise, inter alia, gum arabic and related polysaccharides (gellan gum, gum ghati, gum karaya, gum tragacanth), xanthan, emulsan, ramsan, wellan, schizophyllan, polygalacturonates, laminarin, amylose, amylopectin and pectins.

"Starches of recombinant origin" or "recombinant starches" means, in particular, starches which can be produced by fermentation processes using organisms which do not occur in nature, but natural organisms modified with the aid of genetic engineering methods, such as fungi, algae or bacteria, or with the inclusion and aid of fermentation processes. Examples of starches from genetically modified fermentation processes are, inter alia, amylose, amylopectin and other polyglucans.

"Starches produced by biotransformation" means in the context of the invention that starches, amylose, amylopectin or polyglucans are produced by catalytic reaction of monomeric building blocks, generally oligomeric saccharides, in particular monosaccharides and disaccharides, by using a biocatalyst (also: enzyme) under specific conditions. Examples of starches from biocatalytic processes are, inter alia, polyglucan and modified polyglucans, polyfructan and modified polyfructans.

According to the invention the terms "derivatives of starches" or "starch derivatives" mean quite generally modified starches, that is to say those starches in which, to change their properties, the natural amylose/amylopectin ratio has been changed, a pregelatinization has been carried out, which have been subjected to partial hydrolytic degradation or which have been chemically derivatized.

These derivatives of starches include, inter alia, oxidized starches, for example dialdehyde starch, or other oxidation products containing carboxyl functions, or native ionic starches (for example containing phosphate groups) or further ionically modified starches, not only anionic but also cationic modifications coming under this term.

In addition to the constituents serving as gelation agent, the inventive gel comprises a plasticizer or solvent, with mixtures also being able to be used here, as swelling agent.

Examples of suitable swelling agent are water, polyalcohols such as ethylene glycol, glycerol, propanediol, erythritol, mannitol, sorbitol, polybasic alkanoic acids such as maleic acid, succinic acid, adipic acid, polybasic hydroxyalkanoic acids, such as lactic acid, 2-hydroxybutyric acid, citric acid, malic acid, dimethyl sulfoxide, urea or other starch solvents.

Preferably, the ratio of the weight fraction of polyglucan to starch in the gel or the underlying gelation agent is from 0.01 to 1, in particular from 0.01 to 0.60, and particularly preferably from 0.01 to 0.50, very particularly preferably from 0.01 to 0.40 and most preferably from 0.01 to 0.30.

The ratio of the weight fraction of polyglucan and starch to swelling agent is generally in the range from 0.01 to 0.6.

Depending on the components used in a specific case or particular application, these values can also vary upward or downward.

The weight fraction of polyglucan, however, should not be too low, since otherwise the extensibility or strength of the resultant gel can be impaired.

Obviously the inventive gel, in addition to said essential components, can comprise further additives, as are customary for the respective application.

The invention provides a rubbery elastic gel which is edible, is biodegradable and compostable in natural surroundings.

In principle, the inventive gel can act as a substitute for gelatin in abovementioned application sectors. A particular use is the production of capsules, or for delayed release systems, for example for medicine. The gels can be used for applications in the food or drinks sector, in medicine or pharmacology, in agrochemistry or cosmetics. They can be given the active compounds and/or additives required for this. For these applications if required, they can be brought into an appropriate form, such as fibers, sheeting, film, monofilament, tablets, capsules or the like. A further field of application is the production of delayed release systems, called controlled-release systems.

BRIEF DESCRIPTION OF THE DRAWINGS

FIGS. 2.1, 3.1 show the effect of the PG/starch network on strength,

FIGS. 2.2, 3.2 show the effect of the PG/starch network on the modulus of elasticity E, FIGS. 2.3, 3.3 show the effect of the PG/starch network on the elongation at break, FIG. 4.1 shows the effect of concentration c of the solution on the strength of the PG/starch network, FIG. 4.2 shows the effect of concentration c of the solution on the modulus of elasticity E of the PG/starch network, FIG. 4.3 shows the effect of concentration c of the solution on the elongation at break of the PG/starch network.

Figure 1:
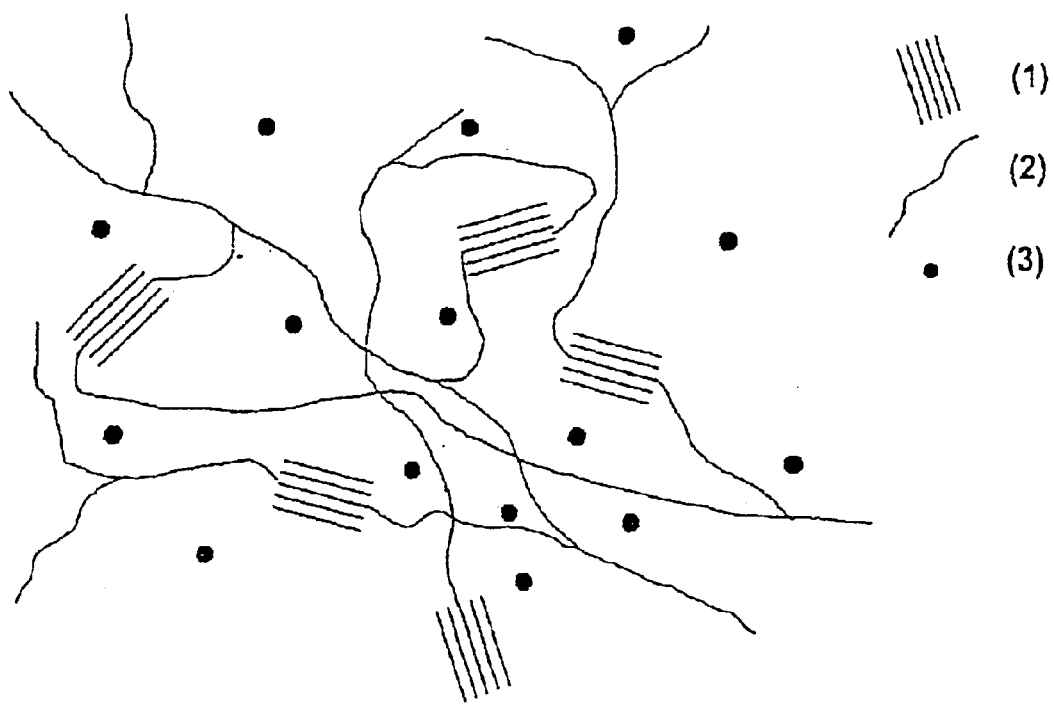
FIG. 1 shows diagrammatically the structure of an inventive gel.

Here, polyglucan crystallites possibly together with a co-crystallized starch content, form crosslinking points (1) in the gel network, and the non-crystallized starch content forms links (2) between the crystallites or crosslinking points (1). Reference number (3) denotes swelling agent (plasticizer) incorporated in the network.

The crystallites which are linked by noncrystalline starch macromolecules form what is termed the microphase, the elastically active network.

The formation of the elastically active network which extends over the entire sample dimension is controlled by the stoichiometry of the number and functionality of the crosslinking points.

The theory of network formation is assumed to be as follows:

In the course of the gel formation process, the crystallites percolate via the partial incorporation of co-crystallized starch molecules. The achievement of percolation can be described by the critical degree of branching Ac (where Ac=critical value of A), where A is the proportion of functionalities of the crosslinking points which have reacted in the course of gel formation. The number of elements which can be linked in a network point is described as the functionality f.

Ac is described by the relationship $Ac=1/(f-1)$.

If the functionality is 2, the percolation Ac=1 is achieved only with complete conversion of all functionalities.

In the gels described here, the functionality is described by the number of co-crystallized starch molecules per crystallite (n) and by the number of crystallites per starch molecule (x):

$$f=(x-1)(n-1)+1$$

Because here it is expected that x is greater than 1 and n is greater than 1, it follows that f>>1.

The real part of the shear modulus (G) in shear oscillation experiments can be related to the functionality f and the volume concentration of the elastically active network elements (Ne/V):

$$G=((fn-2)/fn)RTNe/V$$

where R=gas constant

T=temperature in ° K fn=number average of the functionality.

Since fn>>1: $G=RT\,Ne/V$.

The modulus of the swollen network (Gq) can be determined from the swelling factor (Vq/Vo):

$$Gq=Go\,Vo/Vq$$

where Go=modulus of the unswollen network.

In contrast to gelatin gels, the inventive polyglucan/starch gels are not thermally reversible, this means that the crystallites do not disperse solely by increasing the temperature. In order to disperse them, a suitable solvent is required, for example KOH or dimethyl sulfoxide (DMSO).

The network density and thus also the mechanical properties such as modulus, elongation and stress at break can be effected by swelling or shrinking.

The swelling agents can be the abovementioned, plasticizers such as water and/or glycerol being preferred. The shrinking agent can be ethanol, methanol or acetone.

The glassy solidification temperature (Tg), the cooperative segmental motions of the macromolecules freeze and therefore their conformational changes in the gel freeze and the gels become brittle, losing their rubbery elasticity.

Since the glassy solidification temperature is highly dependent on the swelling factor and also the type of swelling medium, a general relationship for Tg cannot be formulated.

The greatest influence on the network density and thus on the mechanical properties of the gels, at a comparable degree of swelling, is exerted by the relative proportion of PG in the starch. This relationship is illustrated in the examples below.

Quite generally, the inventive gels can be produced by precipitating polyglucan (PG) with or without the presence of starch, in a suitable solvent, crystallization gels forming by cocrystallization of PG with or without starch. As to the crystallites of PG, studied by X-ray wide angle scattering on polycrystalline samples, the gels also exhibit crystallites of the native potato starch type.

Gel formation in the systems can be initiated, for example, by reducing the solvent concentration and/or the temperature.

The resultant elastic/rubbery elastic phases are stable in the temperature range between the glassy solidification temperature of starch and the melting temperature of the PG/starch crystallites.

It has been found that the shear modulus and strain modulus of the resultant gels are correlated to the number of crystallites in the gel, so that their extensibility and strength can therefore be set by the proportion of PG.

For example, production may proceed by coprecipitation of a first solution of starch dissolved in one or more plasticizers and a second solution containing dissolved polyglucan.

For this purpose polyglucan can be dissolved, for example, in a strong alkali metal hydroxide solution, for example potassium hydroxide solution with a molarity from 0.01 to 3.0.

The solutions are mixed and the precipitation is initiated by neutralizing the resultant mixture with an acid, for example phosphoric acid, citric acid or the like.

Preferably the neutralization is performed, in particular at high PG contents, at elevated temperature, in order to prevent premature gel formation before completion of neutralization which could impair the homogeneity of the resultant gels. A suitable temperature range is 50–60° C.

In addition, the inventive gels can be produced from the melt, in which case a chamber kneader or twin-shaft kneading extruder can be used. In this case the gels can be obtained in the form of fibers, monofilaments, films or sheetings.

For example, a co-rotating, close-meshing and self-cleaning twin-shaft kneading extruder can be used.

For this purpose, the extruder can be equipped downstream of the exit die with a static mixer and heat exchanger, for example. At the exit of the mixer, optionally, a broad slot die or a fiber spinneret can be mounted.

In addition, in the event that an alkali metal hydroxide solution as mentioned above in connection with the precipitation had been added to the polyglucan, this alkali metal hydroxide solution can be neutralized here in the downstream mixer.

It is essential that in the extrudate the percolation of the elastically active elements of the gel does not take place until after the shaping to form a film or fibers.

The extruded films or fibers can, as required, be passed into a bath containing precipitant such as methanol, ethanol, acetone or the like, and then stretched and dried.

Preference is given to gel formation by precipitation in the solution, since in formation from the melt thermal degradation of PG can occur.

The present invention will be described in more detail below with reference to examples, where for the examples an inventively preferred linear water-insoluble polyglucan has been used.

The polyglucan specifically used for the examples had a number-average $M_n$ of 65 and a weight-average $M_W$ of 85. These examples are intended to serve for illustration.

EXAMPLES

1. Solubility of Poly-α-1,4-glucan in KOH

Because of the high stability of the PG crystallites and the tendency to thermal degradation of PG at elevated temperatures, for the preparation of the gel, network formation in solution is preferred compared with a thermoplastic melt process in the presence of a plasticizer.

For network formation in solution, the solubility of PG in KOH was studied. The table below reproduces the solubility of differing amounts of PG in aqueous KOH.

| Solvent [M] KOH | T [° C.] | PG [g] | t [min] |
| --- | --- | --- | --- |
| 0.50 | 43 | 12 | 4 |
|  | 43 | 15 | insoluble |
| 0.75 | 43 | 18 | 1 |
|  | 43 | 27 | insoluble |
| 1.00 | 25 | 12 | 1 |
|  | 25 | 18 | 1 |
|  | 25 | 27 | 5 |

To assess solubility, one drop of the solution was examined under the microscope, undissolved PG crystallites being able to be observed readily.

Possible turbidity and green to yellow discoloration of the solution are due to the impurity of the PG used.

2. Network Formation

Starch solutions having a starch content (Paselli WA 4 from AVEBE, approximately 78% amylopectin) of 5.5 g in 100 ml of 0.5 M aqueous KOH solution containing in each case equivalent amounts of glycerol were mixed with PG solutions (5.5 g in 100 ml of 0.5 M aqueous KOH solution) in various ratios at room temperature and then neutralized with orthophosphoric acid.

From a PG content greater than 10% (based on the content of starch and PG), spontaneous gel formation proceeded during neutralization, a white coloration of the material being able to be observed.

Gel formation proceeded more rapidly, the higher the PG content. In addition, the gel strength increased with the PG content.

At a PG content less than 10%, gel formation began with a delay, and the strength and white coloration of the resultant gels was less.

The observed white coloration is due to crystallization of PG, since the crystallites have a different refractive index from the solution and the gel formation found verifies that obviously amylopectin side chains have actually been incorporated into the PG crystallites.

For confirmation, the PG solution was neutralized before mixing with the starch solution. In this case PG precipitated out as a whitish suspension of crystallites.

The mixtures of these suspensions with the starch solution still remained liquid even after neutralization, and no gel formation was found. The absence of gel formation is due to the fact that the PG crystallites have already precipitated out before mixing, and are thus no longer available for incorporation of amylopectin side chains.

This finding confirms the fact that it is possible using PG to crosslink a starch solution by crystalline crosslinking points and obtain a gel.

To prevent gel formation from beginning as early as before neutralization is complete, and as a result impairing the homogeneity of the resultant gels, neutralization can be carried out at elevated temperature, for example at 50 to 60° C., thus making it possible even at high PG content for gel formation not to start until after neutralization during cooling.

Using the above-described process, films were produced which comprised, in addition to starch and the network former PG, glycerol as plasticizer and water which was set to a desired content by means of suitable drying.

In addition, the film comprised traces of potassium phosphate due to neutralization.

3. Experimental Series I, II and III

Experimental series I and II were used to produce networks having a variable PG content. In these studies starch WA4 was dissolved with the equivalent amount of glycerol in 0.5 M KOH at room temperature, and PG without glycerol at 43° C. The concentration of WA4 and PG was in each case 0.05 g/ml. Mixtures having various PG contents were produced therefrom, heated to 50° C. and neutralized with orthophosphoric acid. The mixtures were then poured onto Teflon films and dried in the atmosphere. In experimental series III, starch WA4 was dissolved in water with the equivalent amount of glycerol.

The dissolved PG, however, was neutralized before mixing with the starch solution, PG precipitating out. It was thus ensured that PG, in contrast to experimental series I and II, could not form a network with the starch. The two components were not mixed until thereafter, heated to 50° C., used to cast films and dried. To achieve comparable water contents, the films were then stored in a desiccator for two weeks over a saturated lithium chloride solution having a water activity of 0.113. Samples for the tensile tests were then punched from the conditioned films and, in the tensile test, studied for their mechanical properties.

The results are listed in table 1. In this and the other tables:
PG: means PG content (based on PG+starch),
Gly: means glycerol content (based on total mixture),
$H_2O$: means water content (based on total mixture),
E: means modulus of elasticity,
$\sigma_m$: means maximum strength,
$\epsilon_m$: means extension at maximum strength,
$\epsilon_b$: means elongation at break, d: means sample thickness.

The tensile tests were carried out at 13 mm sample length and at an elongation rate of 70 mm/min.

In FIG. 2.1, the strengths are plotted as a function of PG content (based on starch plus PG) for the experimental series I, II and III.

The measured points of III where there is no network lie on an ascending curve, since with increasing PG content the glycerol content was reduced (since it is not known how much glycerol the PG crystallites used can take up, the glycerol content was set so that it is constant with respect to the starch content for the various mixtures).

The curves for series I and II are shifted toward higher strengths by an amount of somewhat more than 2 MPa from a PG content of somewhat more than 5% This strengthening is to be accounted to the PG/starch network.

FIG. 2.2 shows, for the same experimental series, the moduli of elasticity as a function of PG content. The mixtures which can form a network have, above somewhat more than 5% PG, significantly higher moduli of elasticity compared with the mixtures without a network.

The situation regarding the modulus of elasticity is similar to that regarding strength.

The elongations at break are plotted as a function of PG content in FIG. 2.3. They are somewhat higher for the network than without a network, but the difference is less marked compared with strength and modulus of elasticity. Possibly, this is due to the fact that the conditioned films still contained air bubbles, which adversely affected the accuracy of the mechanical properties.

TABLE 1

| No. | PG % | Gly % | $H_2O$ % | E MPa | $\sigma_m$ MPa | $\epsilon_m$ % | $\epsilon_b$ % |
|---|---|---|---|---|---|---|---|
| I | Starch and PG dissolved in 0.5 M KOH (each at 0.05 g/ml), mixed and neutralized at 50° C.; water content: 5.43 ± 0.44 | | | | | | |
| I-1 | 6.1 | 45.5 | 4.91 | 56 ± 56 | 4.7 ± 1.5 | 69 ± 56 | 73 ± 55 |
| I-2 | 7.6 | 45.1 | 5.26 | 135 ± 50 | 7.4 ± 0.4 | 64 ± 39 | 69 ± 37 |
| I-3 | 11.4 | 44.0 | 5.62 | 142 ± 26 | 7.8 ± 2.4 | 79 ± 19 | 84 ± 18 |
| I-4 | 15.2 | 43.0 | 5.93 | 154 ± 21 | 8.3 ± 1.3 | 61 ± 26 | 68 ± 23 |
| II | Starch and PG dissolved in 0.5 M KOH (each 0.05 g/ml), mixed and neutralized at 50° C.; water content: 5.29 ± 0.51 | | | | | | |
| II-2 | 6.1 | 45.3 | 4.99 | 68 ± 36 | 6.0 ± 2.4 | 72 ± 9 | 79 ± 9 |
| II-3 | 7.6 | 44.9 | 5.42 | 145 ± 59 | 8.1 ± 2.0 | 58 ± 6 | 64 ± 7 |
| II-4 | 11.4 | 43.9 | 4.58 | 158 ± 14 | 8.6 ± 0.4 | 67 ± 7 | 74 ± 12 |
| II-5 | 15.1 | 42.8 | 5.75 | 191 ± 53 | 9.3 ± 1.5 | 72 ± 10 | 77 ± 12 |
| II-6 | 22.6 | 40.6 | 4.78 | 277 ± 90 | 11.3 ± 2.7 | 11 ± 2.6 | 43 ± 6 |

TABLE 1-continued

| No. | PG % | Gly % | $H_2O$ % | E MPa | $\sigma_m$ MPa | $\epsilon_m$ % | $\epsilon_b$ % |
|---|---|---|---|---|---|---|---|
| II-7 | 30.0 | 38.2 | 5.74 | 270 ± 42 | 12.5 ± 1.1 | 22 ± 4 | 30 ± 9 |
| II-8 | 37.3 | 35.6 | 5.79 | 230 ± 95 | 11.5 ± 6.6 | 6.3 ± 3.5 | 8.1 ± 4.8 |
| III | Starch dissolved in $H_2O$, PG in 0.5 M KOH (each 0.05 g/ml) and precipitated out by neutralization at 50° C., then mixed with starch solution; water content: 5.45 ± 0.98 | | | | | | |
| III-1 | 0.0 | 46.9 | 4.53 | 23 ± 9 | 4.1 ± 1.2 | 105 ± 35 | 109 ± 36 |
| III-2 | 5.8 | 45.4 | 6.87 | 61 ± 27 | 5.5 ± 1.3 | 52 ± 13 | 91 ± 14 |
| III-3 | 7.6 | 44.9 | 6.51 | 65 ± 3 | 5.7 ± 0.3 | 55 ± 9 | 84 ± 10 |
| III-4 | 11.4 | 43.9 | 5.02 | 70 ± 25 | 6.1 ± 1.6 | 71 ± 24 | 76 ± 25 |
| III-5 | 15.1 | 42.8 | 4.82 | 80 ± 22 | 7.0 ± 1.0 | 87 ± 6 | 90 ± 7 |
| III-6 | 22.6 | 40.6 | 4.97 | 103 ± 46 | 7.5 ± 0.3 | 20 ± 2 | 54 ± 4 |

However, comparing the experimental series I and II with III clearly verifies the presence of a network and its advantages.

4. Experimental Series IV, V, VI and VII

In a similar manner to the above-described experimental procedure under 2., in the experimental series IV and V networks having differing PG contents were produced, whereas in the experimental series VI and VII, PG was precipitated out by neutralization before mixing with the starch solution, so that no network could form. However, in the case of series V and VII, in contrast to the preceding experiments an amount of glycerol equivalent to the PG content was added to the PG solutions, so that for all mixtures of these series the glycerol content was constant at 50%.

In FIG. 3.1, where the strengths of films of these mixtures are shown, therefore the increase in strength with increasing PG content for series V and VII at a constant glycerol content is markedly lower compared with series IV and VI. However, both possible methods of sample production indicate that, by forming a network, higher strengths can be obtained.

The mechanical properties measured in the tensile test are listed in tables 2a and 2b. The samples of these experimental series were not conditioned over saturated lithium chloride solution, but were dried in the atmosphere. The water content therefore varied from sample to sample, as is also recorded in table 2a and 2b, in particular the water content increased with PG content somewhat, because with increasing PG content, when the network is produced, higher viscosity liquids and correspondingly thinner films were obtained. However, the series VI and IV, and V and VII were comparable with respect to the water content, the differences measured are relatively small.

TABLE 2a

| No. | PG % | Gly % | H$_2$O % | E MPA | $\sigma_m$ MPa | $\epsilon_m$ % | $\epsilon_b$ % | d mm |
|---|---|---|---|---|---|---|---|---|
| VI | Starch and PG dissolved in 0.5 M KOH (each 0.05 g/ml), PG separately neutralized at room temperature, then mixed with the starch solution and neutralized at 50° C. | | | | | | | |
| VI-1 | 0 | 49.5 | 7.84 | 4.0 ± 1.5 | 1.71 ± 0.20 | 210 ± 10 | 221 ± 13 | 0.33 ± 0.07 |
| VI-2 | 2.9 | 48.8 | 8.63 | 3.9 ± 0.8 | 1.60 ± 0.29 | 202 ± 10 | 218 ± 22 | 0.31 ± 0.02 |
| VI-3 | 4.9 | 48.3 | 9.44 | 4.9 ± 1.2 | 1.78 ± 0.21 | 190 ± 4 | 205 ± 4 | 0.33 ± 0.05 |
| VI-4 | 9.8 | 46.9 | 9.47 | 6.9 ± 2.7 | 2.00 ± 0.56 | 184 ± 16 | 192 ± 18 | 0.31 ± 0.06 |
| VI-5 | 19.7 | 44.1 | 9.58 | 17.1 ± 6.8 | 2.95 ± 0.33 | 143 ± 16 | 155 ± 16 | 0.30 ± 0.03 |
| VI-6 | 29.6 | 40.9 | 10.60 | 26 ± 7 | 4.06 ± 0.40 | 134 ± 22 | 137 ± 21 | 0.32 ± 0.03 |
| VI-7 | 39.6 | 37.2 | 10.85 | 43 ± 13 | 4.27 ± 0.48 | 89 ± 17 | 110 ± 17 | 0.52 ± 0.06 |
| IV | Starch and PG dissolved in 0.5 M KOH (each 0.05 g/ml), mixed at room temperature, heated to 50° C., mixed and neutralized | | | | | | | |
| IV-2 | 2.9 | 48.8 | 9.72 | 9.1 ± 2.4 | 2.11 ± 0.31 | 199 ± 14 | 209 ± 14 | 0.35 ± 0.04 |
| IV-3 | 4.9 | 48.3 | 10.31 | 12.0 ± 2.3 | 2.19 ± 0.20 | 169 ± 6 | 179 ± 10 | 0.29 ± 0.01 |
| IV-4 | 9.8 | 46.9 | 10.34 | 14 ± 1.7 | 2.41 ± 0.23 | 134 ± 12 | 151 ± 13 | 0.22 ± 0.04 |
| IV-5 | 19.7 | 44.1 | 9.25 | 27 ± 1.4 | 3.59 ± 0.26 | 130 ± 9 | 137 ± 9 | 0.37 ± 0.07 |
| IV-6 | 29.6 | 40.9 | 9.64 | 41 ± 9 | 4.88 ± 0.35 | 107 ± 9 | 111 ± 8 | 0.36 ± 0.01 |
| IV-7 | 39.6 | 37.2 | 10.20 | 55 ± 6 | 5.05 ± 0.23 | 76 ± 5 | 79 ± 5 | 0.46 ± 0.03 |

TABLE 2b

| No. | PG % | Gly % | H$_2$O % | E MPA | $\sigma_m$ MPa | $\epsilon_m$ % | $\epsilon_b$ % | d mm |
|---|---|---|---|---|---|---|---|---|
| V | Starch and PG dissolved in 0.5 M KOH (each 0.05 g/ml), mixed at room temperature, heated to 50° C., mixed and neutralized | | | | | | | |
| V-1 | 0 | 50.0 | 7.99 | 5.1 ± 2.1 | 1.54 ± 0.10 | 205 ± 16 | 232 ± 16 | 0.33 ± 0.02 |
| V-2 | 3.5 | 50.0 | 8.56 | 6.9 ± 1.7 | 1.85 ± 0.21 | 191 ± 16 | 201 ± 21 | 0.33 ± 0.02 |
| V-3 | 5.0 | 50.0 | 8.59 | 7.7 ± 3.0 | 1.90 ± 0.08 | 180 ± 8 | 195 ± 9 | 0.26 ± 0.02 |
| V-4 | 10.0 | 50.0 | 9.37 | 6.1 ± 0.7 | 1.74 ± 0.31 | 158 ± 20 | 172 ± 20 | 0.28 ± 0.03 |
| V-5 | 15.0 | 50.0 | 9.28 | 6.9 ± 2.2 | 1.85 ± 0.33 | 167 ± 13 | 173 ± 14 | 0.38 ± 0.05 |
| V-6 | 20.0 | 50.0 | 9.41 | 7.3 ± 1.4 | 2.00 ± 0.32 | 154 ± 9 | 158 ± 9 | 0.31 ± 0.03 |
| V-7 | 25.0 | 50.0 | 9.90 | 10.2 ± 3.5 | 2.10 ± 0.40 | 126 ± 23 | 129 ± 23 | 0.37 ± 0.11 |
| V-8 | 30.0 | 50.0 | 9.76 | 11.6 ± 3.1 | 2.04 ± 0.23 | 119 ± 11 | 123 ± 11 | 0.35 ± 0.04 |
| VII | Starch and PG dissolved in 0.5 M KOH (each 0.05 g/ml), PG neutralized separately at room temperature, then mixed with the starch solution and neutralized at 50° C. | | | | | | | |
| VII-1 | 0 | 50.0 | 8.81 | 3.3 ± 0.5 | 1.32 ± 0.24 | 229 ± 9 | 249 ± 8 | 0.31 ± 0.06 |
| VII-2 | 3.5 | 50.0 | 9.06 | 3.8 ± 1.4 | 1.37 ± 0.21 | 221 ± 16 | 233 ± 34 | 0.29 ± 0.02 |
| VII-3 | 5.0 | 50.0 | 9.07 | 3.7 ± 1.4 | 1.41 ± 0.33 | 231 ± 4 | 244 ± 11 | 0.27 ± 0.03 |
| VII-4 | 10.0 | 50.0 | 9.29 | 3.9 ± 0.5 | 1.39 ± 0.08 | 187 ± 17 | 200 ± 30 | 0.32 ± 0.01 |
| VII-5 | 15.0 | 50.0 | 9.73 | 3.6 ± 1.1 | 1.39 ± 0.27 | 198 ± 6 | 224 ± 24 | 0.27 ± 0.02 |
| VII-6 | 20.0 | 50.0 | 9.00 | 4.6 ± 1.0 | 1.46 ± 0.17 | 183 ± 5 | 209 ± 14 | 0.31 ± 0.05 |
| VII-7 | 25.0 | 50.0 | 9.29 | 5.3 ± 0.8 | 1.53 ± 0.22 | 170 ± 10 | 188 ± 17 | 0.37 ± 0.06 |
| VII-8 | 30.0 | 50.0 | 10.14 | 6.9 ± 1.7 | 1.68 ± 0.09 | 156 ± 19 | 167 ± 25 | 0.28 ± 0.03 |
| VII-9 | 50.0 | 50.0 | 10.10 | 9.5 ± 1.4 | 2.02 ± 0.12 | 134 ± 4 | 144 ± 6 | 0.45 ± 0.08 |

FIG. 3.2 shows the relationship between the modulus of elasticity and PG content for this series. For the moduli of elasticity, qualitatively the same relationships result as for the strengths.

FIG. 3.3 plots the measured elongations at break as a function of PG content. When a network is formed they are significantly lower than without a network when the starch and the PG used form a simple, non-crosslinked two-phase system.

5. Effect of Concentration of the Solutions on the PG/Starch Network

Since it was to be expected that, starting from more highly concentrated solutions, denser networks having a greater number of crosslinking points per unit volume can be obtained, in addition to the above-described experimental series using solutions of in each case 0.05 g of dry starch or dry PG, networks were further produced starting from more highly concentrated solutions, the concentration of starch and PG being in each case 0.09 g/ml and 0.12 g/ml (corresponding to experimental series 8 and 9). See table 3.

The resultant films were again dried in atmosphere, so that although the water content increased with PG content somewhat, the three experimental series are comparable.

FIG. 4.1 shows, for the three concentrations, the strength as a function of PG content. It is very clear here that more highly concentrated solutions give higher strengths and thus also denser networks.

The same circumstance is also reflected in FIG. 4.2, where the modulus of elasticity is plotted as a function of PG content for the three concentrations. Conversely, FIG. 4.3 shows, as expected, denser networks also have lower elongations at break.

It would be expected that the curves in FIGS. 4.1 to 4.3 meet in a point for the PG content of 0%. The deviations are due firstly to variations in water content. However, it is conceivable that even pure starch films may show a dependence on the concentration of the solution from which they were produced (more highly pronounced entanglement at more highly concentrated solutions).

6. Studies on the Swelling Behavior of PG/Starch Networks

Swelling studies over the course of 24 hours in synthetic gastric juice were carried out on the films from series V, VI, VII, VIII and IX.

Figure 5:
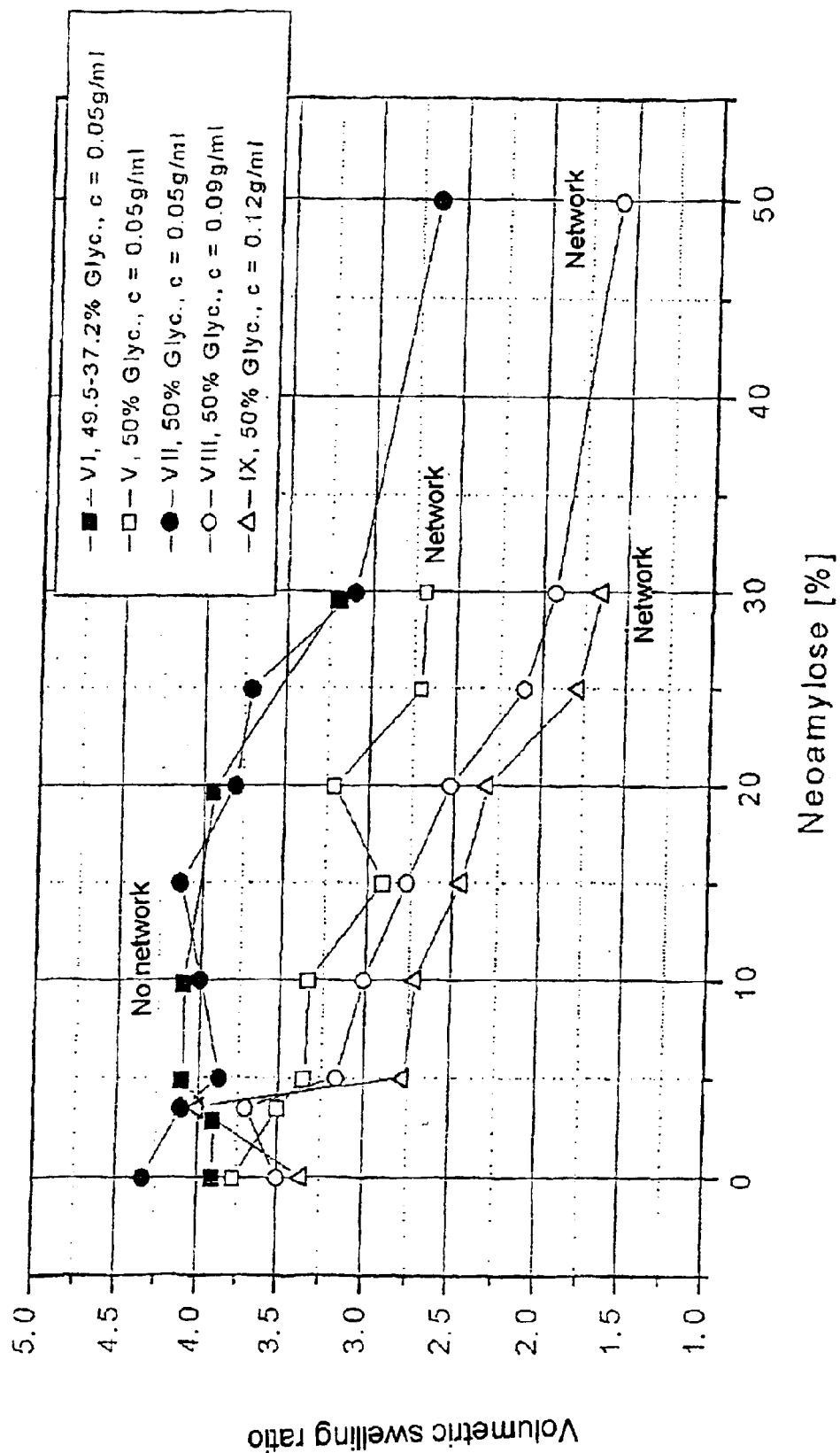
FIG. 5 shows the effect of the density of the PG/starch network on the volume-swelling ratio on synthetic gastric juice.

The resultant volumetric swelling ratios are shown graphically in FIG. 5.

The effect of the PG/starch network becomes very clear here. The films with a network show smaller volumetric swelling ratios than the films without a network and the reduction in the volumetric swelling ratio is favorably influenced by the density of the network, that is to say the more concentrated the solution was from which the network was produced, the lower is the resulting volumetric swelling ratio.

TABLE 3

| No. | PG % | Gly % | $H_2O$ % | E MPA | $\sigma_m$ MPa | $\epsilon_m$ % | $\epsilon_b$ % | d mm |
|---|---|---|---|---|---|---|---|---|
| VIII | Starch and PG dissolved in 0.75 M KOH (each 0.09 g/ml), mixed at room temperature, heated to 60° C., mixed and neutralized | | | | | | | |
| VIII-1 | 0 | 50.0 | 6.57 | 7 ± 2 | 1.80 ± 0.22 | 192 ± 7 | 210 ± 6 | 0.51 ± 0.04 |
| VIII-2 | 3.6 | 50.0 | 6.72 | 9 ± 3 | 2.11 ± 0.36 | 171 ± 19 | 187 ± 40 | 0.51 ± 0.07 |
| VIII-3 | 5.1 | 50.0 | 6.95 | 12 ± 3 | 2.32 ± 0.26 | 170 ± 25 | 177 ± 29 | 0.55 ± 0.03 |
| VIII-4 | 10.2 | 50.0 | 7.22 | 14 ± 2 | 2.41 ± 0.10 | 157 ± 20 | 161 ± 23 | 0.72 ± 0.03 |
| VIII-5 | 15.3 | 50.0 | 8.12 | 15 ± 2 | 2.65 ± 0.16 | 129 ± 15 | 135 ± 17 | 1.04 ± 0.18 |
| VIII-6 | 20.3 | 50.0 | 7.90 | 18 ± 5 | 2.97 ± 0.40 | 95 ± 15 | 101 ± 16 | 0.88 ± 0.04 |
| VIII-7 | 25.4 | 50.0 | 8.42 | 21 ± 3 | 3.09 ± 0.13 | 97 ± 5 | 103 ± 3 | 20.88 ± 0.10 |
| VIII-8 | 30.4 | 50.0 | 8.98 | 24 ± 5 | 3.24 ± 0.16 | 87 ± 10 | 94 ± 9 | 1.09 ± 0.08 |
| VIII-9 | 50.5 | 50.0 | 9.79 | 16 ± 2 | 2.21 ± 0.30 | 40 ± 12 | 45 ± 12 | 1.52 ± 0.36 |
| IX | Starch and PG dissolved in 1.0 M KOH (each 0.12 g/ml), mixed at room temperature, heated to 70° C., mixed and neutralized | | | | | | | |
| IX-1 | 0 | 50.0 | 6.10 | 7 ± 5 | 2.20 ± 0.41 | 182 ± 19 | 190 ± 19 | 0.62 ± 0.07 |
| IX-2 | 3.5 | 50.0 | 6.36 | 11 ± 3 | 2.95 ± 0.46 | 165 ± 10 | 171 ± 14 | 0.47 ± 0.05 |
| IX-3 | 5.0 | 50.0 | 6.27 | 14 ± 6 | 3.15 ± 0.04 | 156 ± 5 | 162 ± 4 | 0.72 ± 0.01 |
| IX-4 | 10.0 | 50.0 | 6.36 | 25 ± 5 | 3.84 ± 0.41 | 101 ± 8 | 109 ± 10 | 0.52 ± 0.08 |
| IX-5 | 15.0 | 50.0 | 6.07 | 34 ± 8 | 3.99 ± 0.36 | 72 ± 13 | 82 ± 13 | 0.63 ± 0.12 |
| IX-6 | 20.0 | 50.0 | 7.19 | 37 ± 7 | 3.81 ± 0.12 | 53 ± 18 | 60 ± 20 | 0.66 ± 0.16 |
| IX-7 | 25.0 | 50.0 | 8.21 | 35 ± 4 | 3.65 ± 0.16 | 51 ± 14 | 54 ± 16 | 1.39 ± 0.15 |
| IX-8 | 30.0 | 50.0 | 9.53 | 40 ± 5 | 3.49 ± 0.37 | 22 ± 3 | 28 ± 4 | 1.22 ± 0.08 |

What is claimed is:

1. A gel comprising linear poly-α-1,4-glucan having a degree of branching of $\leq 10^{-3}$, swelling agent, and starch, the get made by a process comprising mixing a first solution containing dissolved starch with a second solution of said linear poly-α-1,4-glucan, and carrying out a precipitation step.

2. The gel as claimed in claim 1, wherein the linear poly-α-1,4-glucan is water-insoluble.

3. The gel as claimed in claim 1, wherein the linear poly-α-1,4-glucan has a polydispersity of 1.01 to 50.

4. The gel as claimed in claim 1, wherein the ratio of the weight fraction of poly-α-1,4-glucan to starch is in the range from 0.01 to 1.

5. The gel as claimed in claim 1, wherein the ratio of the weight fraction of poly-α-1,4-glucan and starch to swelling agent is in the range from 0.01 to 0.6.

6. The gel as claimed in claim 1, wherein the swelling agent is a plasticizer selected from the group consisting of water, ethylene glycol, glycerol, propanediol, erythritol, mannitol, sorbitol, maleic acid, succinic acid, adipic acid, lactic acid, 2-hydroxybutyric acid, citric acid, malic acid, dimethyl sulfoxide, and urea.

7. The gel as claimed in claim 1, wherein the gel is edible and/or biodegradable.

8. The gel as claimed in claim 1, wherein the gel additionally comprises at least one further pharmacologically, cosmetically and/or agrochemically active constituent, and/or an odor- and/or flavor-modifying additives.

9. The gel as claimed in claim 1, wherein the linear poly-α-1,4-glucan has a degree of polymerization in a range from 30 to 300.

10. A process for producing a gel comprising linear poly-α-1,4-glucan having a degree of branching of $\leq 10^{-3}$, swelling agent, the process comprising mixing a first solution containing dissolved starch with a second solution of said poly-α-1,4-glucan, and carrying out a precipitation step.

11. The process as claimed in claim 10, comprising dissolving the poly-α-1,4-glucan in an alkali metal hydroxide solution and carrying out the precipitation step by neutralizing the alkali metal hydroxide solution with acid.

12. The process as claimed in claim 11, wherein the alkali metal hydroxide solution is potassium hydroxide solution having a molarity from 0.01 to 3.0.

13. The process as claimed in claim 11, wherein the acid is selected from the group consisting of phosphoric acid and citric acid.

14. The process as claimed in claim 10, comprising mixing the first and second solutions in a twin-shaft extruder.

15. The process as claimed in claim 11, comprising mixing the first and second solutions in a twin-shift extruder and carrying out the neutralization in a mixer downstream of the extruder.

16. The process as claimed in claim 14, wherein a broad slot die or fiber spinneret is disposed downstream of the extruder, for shaping.

17. The gel an claimed in claim 1, comprising a film, sheeting, monofilament or fiber.

18. A cosmetic article comprising the gel as claimed in claim 1 and a cosmetic ingredient.

19. A capsule comprising the gel as claimed in claim 1 in the form of a capsule containing an active ingredient.

20. The process as claimed in claim 15, wherein a broad slot die or fiber spinneret is disposed downstream of the mixer, for shaping.

21. The gel of claim 1, wherein the process further comprises dissolving the poly-α-1,4-glucan in an alkali metal hydroxide solution and carrying out the precipitation step by neutralizing the alkali metal hydroxide solution with acid.

22. The gel of claim 21, wherein the alkali metal hydroxide solution is potassium hydroxide solution having a molarity from 0.01 to 3.0.

23. The gel of claim 21, wherein the acid is selected from the group consisting of phosphoric acid and citric acid.

24. The get of claim 21, wherein the process further comprises mixing the first and second solutions in a twin-shaft extruder.

25. The gel of claim 24, wherein a broad slot die or fiber spinneret is disposed downstream of the extruder, for shaping.

26. The gel of claim 1, wherein the process comprises mixing the first and second solutions in a twin-shaft extruder and carrying out the neutralization in a mixer downstream of the extruder.

27. The gel of claim 26, wherein a broad slot die or fiber spinneret is disposed downstream of the extruder, for shaping.

28. A controlled-release system comprising the gel of claim 1 in the form a capsule containing an active controlled-release ingredient.

29. An agrochemical composition comprising the gel of claim 1 and an agrochemical.

30. A nutritional composition comprising the get of claim 1 and a nutritional ingredient.

* * * * *